United States Patent [19]

Jezek et al.

[11] 4,258,462

[45] Mar. 31, 1981

[54] METHOD OF ASSEMBLING THREADED BASE TO A PROJECTILE

[75] Inventors: Bruce W. Jezek; Glen L. McClung, both of Baltimore, Md.

[73] Assignee: The United States of America as represented by the Secretary of the Army, Washington, D.C.

[21] Appl. No.: 62,610

[22] Filed: Aug. 1, 1979

Related U.S. Application Data

[62] Division of Ser. No. 935,182, Aug. 18, 1978, Pat. No. 4,193,328.

[51] Int. Cl.³ ............................................. B23P 19/00

[52] U.S. Cl. ...................................................... 29/428

[58] Field of Search ...................... 29/428, 240; 81/72, 81/3.05

[56] References Cited

U.S. PATENT DOCUMENTS

| | | | |
|---|---|---|---|
| 705,724 | 7/1902 | Upson | 81/72 |
| 1,313,479 | 8/1919 | George | 81/72 |
| 1,843,537 | 2/1932 | Bickerstaff | 81/72 |
| 1,981,656 | 11/1934 | Masters et al. | 81/72 |
| 2,468,867 | 5/1949 | Collins | 81/72 |
| 2,482,501 | 9/1949 | Oravetz | 81/72 |
| 2,800,043 | 7/1957 | Young | 81/72 |

*Primary Examiner*—Charlie T. Moon
*Attorney, Agent, or Firm*—Nathan Edelberg; Robert P. Gibson; Max Yarmovsky

[57] ABSTRACT

A torque adapter apparatus for threading an externally threaded base member having a smooth bore rear end to an internally threaded tubular projectile housing. The adapter utilizes a biased pegged locking plate member to initially retract a plurality of peripherally positioned friction camming elements to permit insertion of the adapter within the base member rear end. Once the adapter is within the base of the base member the pegged locking plate biasedly cams a plurality of tape locking elements into a locked position permitting torquing of base member to the threaded projectile housing.

1 Claim, 8 Drawing Figures

METHOD OF ASSEMBLING THREADED BASE TO A PROJECTILE

GOVERNMENTAL INTEREST

The invention described herein may be manufactured, used and licensed by or for the Government for governmental purposes without the payment to us of any royalty thereon.

This is a division of application Ser. No. 935,182 filed Aug. 18, 1978 now U.S. Pat. No. 4,193,328, issued Mar. 18, 1980.

BACKGROUND OF THE INVENTION

Various means have been used in the prior art to thread an externally threaded base member into an internally threaded projectile housing. In order to accomplish the torquing necessary to join both members frequently assembly slots had to be machined into the work piece. Machining operations to the base member work piece in the form of slots, holes or grooves to facilitate transmission of torque was frequently time consuming and costly to produce. The prior art frequently required manual assembly of the threaded part members in order to prevent the work piece from slipping out of the attachment slots and causing damage to the work piece.

SUMMARY OF THE INVENTION

The present invention relates to a production type adapter assembly tool which facilitates torquing and tightening of an externally threaded base member having a smooth bore in a rear end to an internally threaded tubular projectile housing. A torsionally biased pegged locking plate member is operatively connected to a lug housing holding a plurality of taper locking lug elements. Initial rotation of the pegged plate member in one direction permits insertion of the adapter in the bore of the base member. Counter rotation causes taper locking lug elements to be cammed against the base member permiting manual threading and subsequent tightening by a production type nutrunner.

An object of the present invention is to provide an apparatus for rapidly threading an externally threaded base member having a smooth bore therein to an internally threaded end of a projectile housing.

Another object of the present invention is to provide an apparatus for rapid assembly of an externally threaded smooth bore base member to an internally threaded projectile housing by means of a pneumatic nutrunner type tool.

Another object of the present invention is to provide a method of rapidly assembling an externally threaded base member to an internally threaded projectile housing, wherein the base member does not require slots or grooves therein or projections thereon to apply the torquing force from the torque device to the base member.

Another object of the present invention is to provide a method of threadedly assembling an externally threaded base member to an internally threaded projectile housing wherein the smooth inside surface of an externally threaded base member workpiece is used for applying torque from a torque device to facilitate production threading and tightening.

A further object of the present invention is to provide an adapter assembly tool for assembling an externally threaded base member to an internally threaded tubular housing which insures that the base member workpiece will not ship out of engagement with the torquing device causing damage to the workpiece.

For a better understanding of the present invention, together with other and further objects thereof, reference is made to the following descriptions taken in connection with the accompanying drawings.

BRIEF DESCRIPTION OF THE DRAWINGS

Throughout the following description like reference numerals are used to denote like parts of the drawings.

DESCRIPTION OF THE PREFERRED EMBODIMENT

Figure 1:
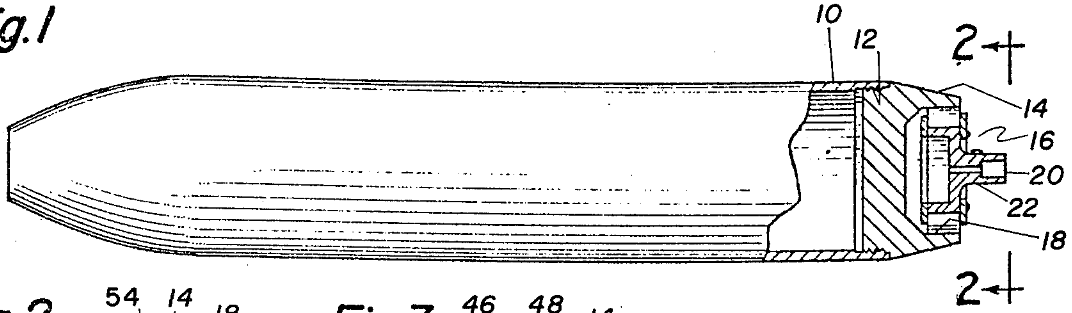
FIG. 1 is a partial cross-sectional view of a tubular projectile housing having an externally threaded base member being attached to an internally threaded rear end of a projectile by a torque-assemblying tool.

Referring now to FIG. 1, tubular projectile body 10 has an internally threaded rear end 12 which has an externally threaded projectile base member 14 screwedly attached thereto by assembly tool 16 which is operatively disposed in a smooth rear counterbore 18 of base member 14. The assembly tool 16 is used to torque the externally threaded base member 14 to the internally threaded rear end 12 of projectile body 10. Usually the threading operation is hand started and then a pneumatic nutrunner, well know in the art and not shown, is inserted into an axial drive socket 20 of axially disposed lug housing hub 22. Where, as in this instance, the projectile body rear end 12 has a left hand thread, the torque applied to tighten base member 14 in projectile body 10 is in a counter clockwise direction.

Referring now to FIGS. 2–8 the assembly tool 16 comprises a retainer ring 24 which is threadedly fixed to a front open side 26 of cup shaped lug housing 28 by means of a plurality of machine screws 30. Screws 30 slidably pass through retainer ring holes 32 and are screwed into threaded lug housing holes 34. The exterior wall 36 of lug housing 28 has a plurality of equally spaced circularly shaped semi-cylindrical lug grooves 38, longitudinally disposed therethrough. The lug grooves 38 rotatably hold therein lock taper torquing lugs 40. Torquing lugs 40 are prevented from sliding out of the ends of lug grooves 38 by retainer ring 24 positioned on one side and by an annularly shaped locking plate member 42 positioned on the other side. Locking plate member 42 is slidably and rotatably attached to the rear side 44 of housing 28 by means of three threaded stop pins 46 which pass through arcuate locking plate slots 48. Sufficient clearance is provided between lug grooves 38 and torquing lugs 40 to allow easy rotational motion of lugs 40 about lug longitudinal axis 49. Locking plate 42 has a plurality of pairs of camming pins 50 and 51 which are rigidly attached by a press fit into camming pin holes 52 located in locking plate 42. Each pair of camming pins 50 and 51 protrude in a direction toward lugs 40 and are equally positioned on locking plate 42 so that each torquing lug 40 is equally positioned between a pair of camming pins 50 and 51. A pair of unlocking pins 54 are press fit in locking plate 42 to protrude in an opposite direction from the camming pins 50 and 51. A flat shaped torsion spring 56 is partially operatively positioned around lug housing hub 22, with one end 58 fixedly attached to hub 22 by a screw 60, the other "U" shaped end 62 is slidably disposed on a spring stop pin 64, which is in turn fixedly attached to locking plate 42.

In operation, referring now to FIGS. 1–8, when the assembly tool 16 is not being used, biased torsion spring 56 causes a clockwise rotation of locking plate 42 forcing camming pin 50 to rotate lug 40 towards its open position. The rotational travel of the locking plate 42 is limited by the length of locking plate slots 48 and the interference between the ends of the slot 48 and the three stop pins 46 attached to the lug housing 28 after passing through slots 48.

Figure 2:
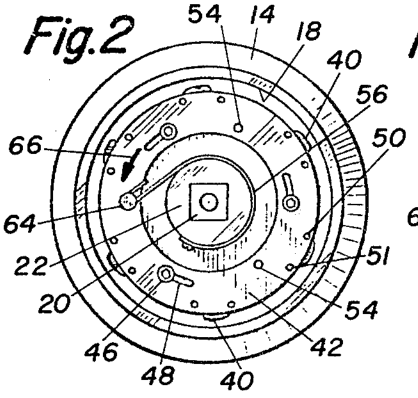
FIG. 2 is rear view of the base end of the projectile and assembly tool taken along line 2—2 of FIG. 1 showing the assembly tool with taper lugs in a closed position.
Figure 3:
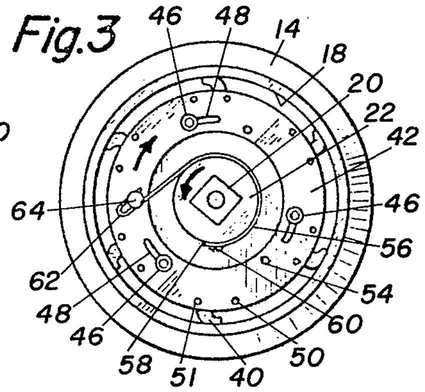
FIG. 3 is the same view as shown in FIG. 2 with the taper lugs in an open position.
Figure 4:
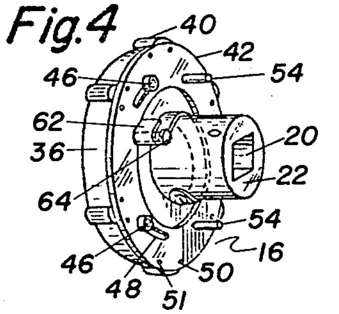
FIG. 4 is an isometric view of the rear side of the assembly tool.
Figure 5:
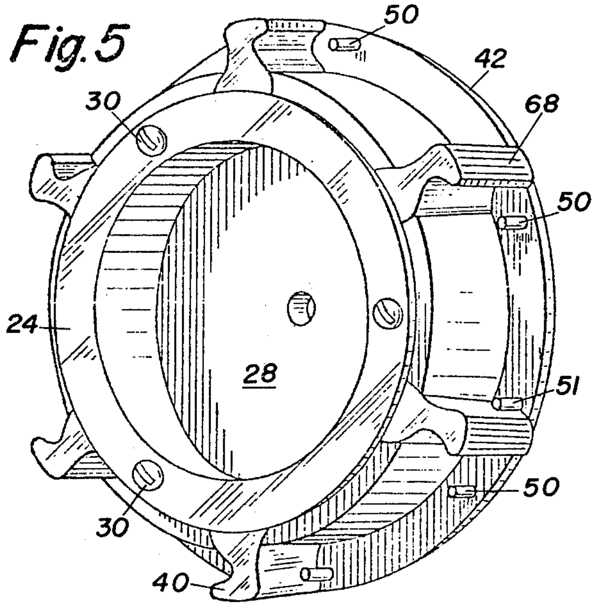
FIG. 5 is an isometric view of the front of the assembly tool showing the torquing lugs in a partially open position.
Figure 6:
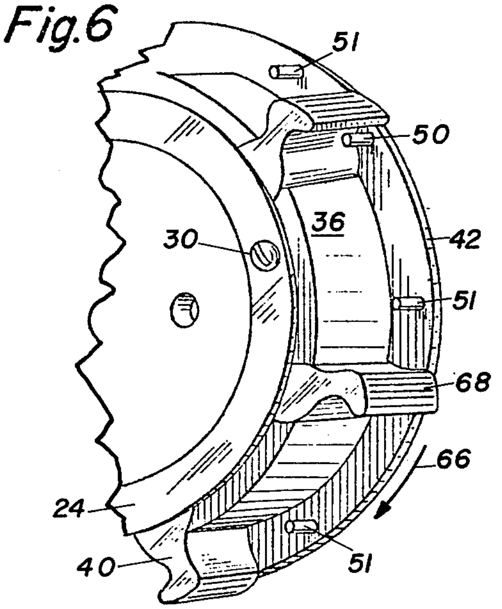
FIG. 6 is an enlarged cutaway isometric view of the front side of the assembly tool showing the locking pins and friction torquing lugs in a completely open position.
Figure 7:
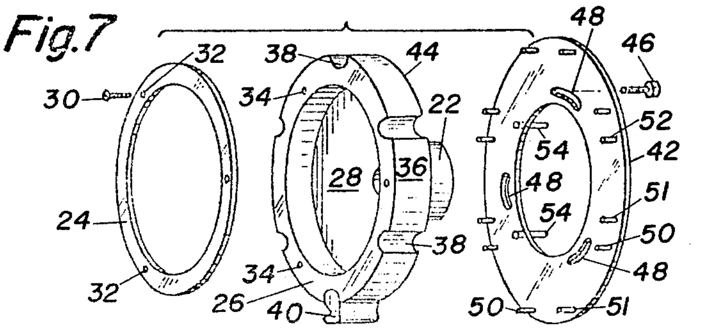
FIG. 7 is an exploded view of the main structural elements of the assembly tool, a retainer ring, lug housing, and pegged locking plate.
Figure 8:
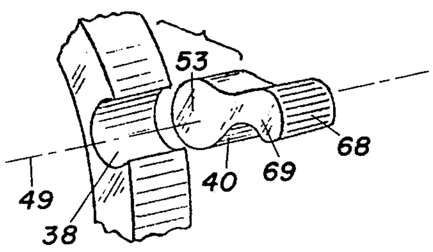
FIG. 8 is an enlarged cutaway partial isometric view of the lug housing and a single torquing lug removed from the housing and a lug groove.

To allow insertion of the assembly tool 16 into the base member rear counterbore 18, the locking plate 42 is rotated in a counter clockwise direction, as indicated by directional arrow 66 in FIGS. 2 and 6 by manually applying force to the two unlocking pins 54. Once the assembly tool 16 has been properly positioned in the base member workpiece 14, the counter clockwise force applied to the unlocking pins 54 is stopped. Release of the unlocking pins causes torsion spring 56 to rotate locking plate 42 in a clockwise direction as shown in FIG. 3. Camming pins 50 now force torquing lugs 40 to rotate on their cylindrically shaped end 53 about longitudinal lug axis 49 outwardly against the counterbore surface 18 of base member 14. An automatic tool, such as a pneumatic nutrunner well known in the art and not shown, having a square shaped male connector thereon is operatively positioned in drive socket 20 and caused to rotate in a counterclockwise direction as shown in FIG. 3. This rotation causes a lug knurled surface 68, on lug taper end 69, to develop frictional force between the lugs 40 and the base member counterbore 18. Torque force is continued by the automatic tool until the workpiece base member 14 is completely screwed into the internally threaded rear end 12 of projectile body 10.

While there has been described and illustrated specific embodiments of the invention, it will be obvious that various changes, modifications and additions can be made herein without departing from the field of the invention which should be limited only by the scope of the appended claims.

Having thus fully described the invention, what is claimed as new and desired to be secured by Letters Patent of the United States is:

1. A method of torquing an externally threaded base member having a smooth counterbore end to an internally threaded projectile housing comprising the steps of:

providing an assembly tool for releasably holding said base member;

rotating a biased locking plate means of said assembly tool to retract a taper locking torquing lug means;

positioning retracted taper locking torquing lug means within said counterbore of said base member;

releasing said biased locking plate means to rotate in a direction which cams said taper locking torquing lug means against said counterbore of said base member;

manually starting the threads of said base member with attached assembly tool;

rotating a lug housing means in a direction which cams a knurled surface of said taper locking torquing means forcibly against counterbore of said base member to complete the threading of said base member to said projectile housing;

rotating said biased locking plate means in a direction which retracts said taper locking torquing lug means; and extracting said assembly tool from said base member.

* * * * *